Patented Oct. 8, 1929

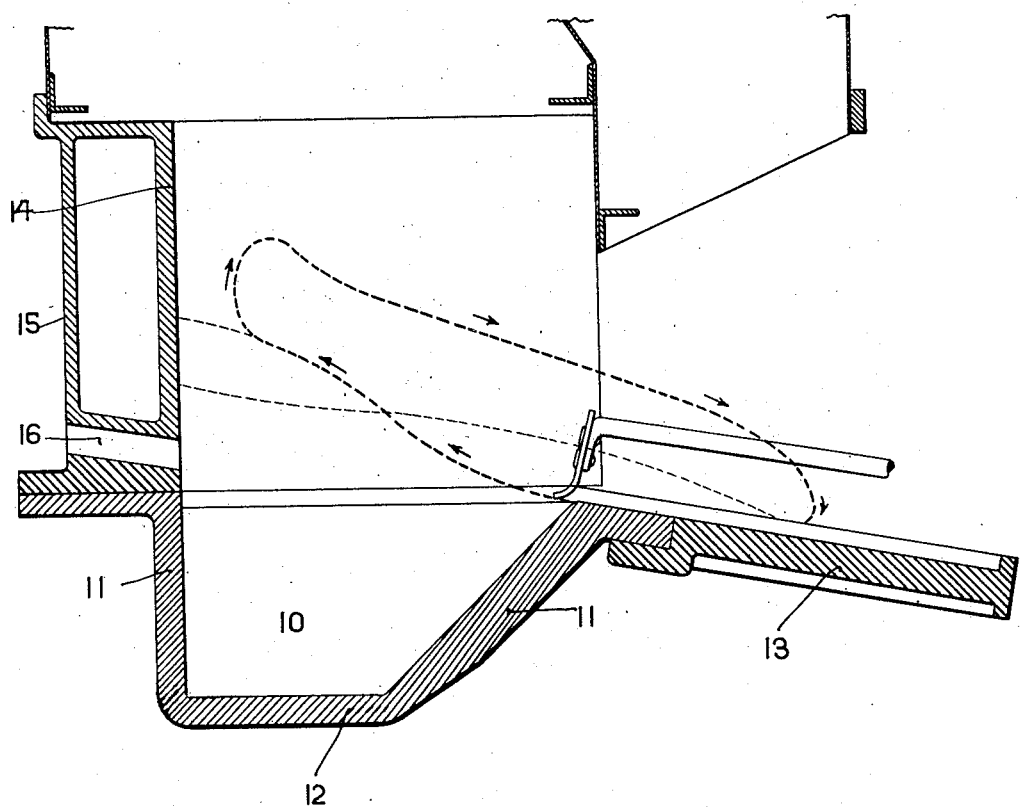

1,730,582

UNITED STATES PATENT OFFICE

HUGH R. MacMICHAEL, OF EL PASO, TEXAS, ASSIGNOR TO AMERICAN SMELTING AND REFINING COMPANY, OF NEW YORK, N. Y., A CORPORATION OF NEW JERSEY

PROCESS OF OPERATING A HEARTH-TYPE FURNACE

Application filed June 3, 1927. Serial No. 196,303.

This invention relates to a process of metal smelting, and, more particularly, to a method of operating a hearth type furnace in the treatment of lead ores whereby the slag may be automatically separated from the charge and may be removed therefrom with a minimum amount of labor.

In the operation of the hearth, upon lead ores, layers of ore and fuel are spread upon the surface, the fuel being artificially ignited at the beginning of the operation and combustion maintained by passing suitable quantities of air through tuyères. As the operation progresses, part of the lead contained in the ore is reduced and passes to the low r portion of the hearth as molten metal, t unreduced portion of the ore floating on tl ? surface in the form of slag. The operation may be made continuous by tapping the molten lead from time to time and by adding ore and fuel at suitable intervals to maintain the bath at the required temperature.

In operating such a device, it is extremely important to maintain the temperature within a given limited temperature range, since metallic lead is volatilized at a temperature slightly above the fusion point thereof. Consequently, the temperature of the bath must be maintained sufficiently high to reduce the lead but must not be allowed to reach the volatilization point. Obviously, if the lead is allowed to volatilize a substantial proportion thereof may be lost in the form of fume, or the fume must be collected and the lead recovered therefrom with a consequent increase in the expense of operation.

One of the principal difficulties in the maintenance of an even temperature in the operation of a hearth as heretofore practiced arises by reason of the uneven slag formation on the surface of the bath and by reason of the fact that the combustion supporting gas is introduced at the rear of the hearth and tends to rise immediately through the material nearest thereto. Also it is necessary to break up the charge at frequent intervals to prevent the same from becoming irregular in the passage of air which is done by introducing a poker or other appropriate tool into and through the charge and then to remove the slag which heretofore has been done manually by an operator who stands in front of the hearth and picks out the larger pieces of the slag with a pair of tongs, a hoe, a rake or other tool. Unless extreme care is taken, therefore, the rear portion of the charge is maintained at a higher temperature than the front portion and an uneven condition of the layer will result from the frequent stirring of the charge and the removal of the slag which will permit the flames to break through at certain places.

This invention comprises operating a hearth in such a manner that the services of the operator for the purpose of withdrawing the slag may be dispensed with and a uniform temperature may be maintained throughout the entire width of the hearth and the formation of blow holes and areas of undesirably high temperature prevented. To accomplish this, the surface of the charge is formed with a slope sufficiently steep to cause particles of ore and slag to roll down toward the front of the hearth and onto the apron after they have been set in motion with a properly regulated velocity. After the charge has been broken up by a poker or by other suitable means then all of the material which is normally ejected by such tool onto the front part of the hearth or onto the apron is pitched or tossed upward and backward so that it will fall upon the slope and an automatic selective action and segregation of the slag particles will occur whereby the smaller particles remain in contact with the water back or on the slope and the larger particles roll forward beyond the hearth onto the apron. This method also provides a comparatively deep mass of ore composed principally of fine material in the back of the hearth where the air pressure from the tuyères is the greatest and the flames most likely to break through and provides relatively coarser material toward the front of the hearth thereby insuring an even and uniform combustion over the entire surface of the hearth.

The invention further consists in the new and novel features of operation and the new and original arrangements and combinations of steps in the process hereinafter described and more particularly set forth in the claims.

Although the novel features which are believed to be characteristic of this invention will be specifically pointed out in the claims appended hereto, the invention itself, as to its objects and advantages, the mode of its operation and the manner of its organization, may be better understood by referring to the following description taken in connection with the accompanying drawing, forming a part thereof. Since such illustration is, however, primarily for purposes of disclosure it will be understood that the structure and the method of operation thereof may be modified in various respects without departing from the broad spirit and scope of the invention.

One embodiment of the invention has been shown for purposes of illustration in the accompanying drawings, in which:

The figure is a sectional view of a hearth type furnace showing diagrammatically the approximate movement of the shovel in practicing this invention.

In the following description and in the claims the various details of the apparatus and the various steps in the process will be identified by specific names for convenience, but they are intended to be as generic in their application as the art will permit.

Referring to the drawings more in detail, the hearth is shown as comprising a basin 10 having the usual side walls 11 and bottom walls 12. An apron 13 may be cast integral with the side walls 11 or mechanically attached thereto and extended with a downward slope to facilitate the operation in a manner to be hereinafter set forth. A water back 14 of usual construction may be provided at the rear of the hearth and equipped with means for circulating a cooling fluid therethrough in a manner which is well known in the art. A wind box 15 connecting with tuyères 16 passing through the water back 14, may be located at the rear of said water back, and connected to a source of compressed air (not shown).

One method of treatment which may be employed, assuming that the hearth has been put into operation and the operation has been continued until the normal quantity of ore, fuel and molten lead is present, comprises feeding the raw ore and fuel thereto either in a pre-determined mixture and of a suitable degree of fineness, or as alternate layers preferably spread evenly over the entire surface of the bath. Combustion is allowed to continue after the normal feeding operation, a sufficient period of time to remove substantial quantities of lead from the ore, during which period some of the particles fuse and frit together forming masses or lumps of so called slag.

The charge is then agitated by means of a poker, which is preferably used in such a manner that the charge is broken up and portions thereof spread onto the apron. The surface may then take the form approximately as shown in the figures as a light dotted line. The direction of movement of the poker may be such that it dips below the bottom of the charge and into the molten bath and is raised through the mass of the charge whereby the material is thrown upwardly or outwardly, the essential feature consisting in disintegration of the mass, which by reason of its cross sectional shape results in a substantial portion of the solid materials falling upon the apron.

The surface may then be re-formed by employing a shovel or leveler of suitable construction which may scrape the material from the apron and pitch the same back above the hearth. The line of travel of the leveler which may be of the form shown in heavy dotted lines on the drawing should be such that the charge is formed with a sufficiently steep slope at a greater angle than the angle of repose of the coarse particles. The leveler may travel parallel to the apron for scraping material therefrom, then over the hearth at an increasing upward angle and with increasing velocity. The path may then flatten slightly and the leveler given a quick flip to throw the material upwardly and against the water back whereby a sufficient momentum is imparted to cause the coarse particles and slag to fall upon and down the slope to the front portion of the bath or onto the apron. The upper portion of the surface may then take approximately the form indicated on the drawing as an extension of the path of the leveler.

The slag may be removed from the apron or from the front of the hearth to which it has precipitated, by any desired means, either before or after the next feeding operation. This preferably should be done before the poker is again employed in order to prevent the slag from becoming mixed with further quantities of solid material which are thrown onto the apron thereby.

The action is also selective as to materials of various sizes within the charge so that the finer particles will remain at the rear portion, and the coarser particles will be removed in more or less uniformly graded sizes toward the front. The comparatively greater depth of fine material at the back of the hearth prevents the flames from breaking through that portion, whereas the coarser materials combined with the lesser depth thereof at the front portion, make the passage of gas easier through that part of the hearth. Consequently, the gases of combustion are deflected from the rear of the hearth, at which point they are naturally more concentrated, toward the front portion.

By suitably selecting the slope of the material whereby the difference in elevation of the front and back may be controlled and by imparting the required momentum to the ore particles the selective separation of the coarse and fine particles may be varied as desired. An even burning may be obtained with a consequent even separation of the lead from the ore. The fuming of the lead may, therefore be controlled and a substantially uniform percentage of the entire lead content of the ore may be recovered in a molten condition at the bottom of the hearth.

The combustion supporting gases rising at the back of the hearth agitate the material at that point and further assist the selective separation.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

What is claimed is:

1. The method of operating a hearth in the smelting of lead ores, which comprises feeding a suitable mixture of ore and fuel thereto, passing combustion supporting gases through said mixture whereby the mass is maintained at a temperature above the fusion point of the lead but below the volatilization point thereof, breaking up the surface of said mixture, reforming said surface with a comparatively steep slope and mechanically imparting a sufficient momentum to the ore particles to cause the larger particles to separate from the finer particles and to roll toward the lower side.

2. The method of operating a hearth in the smelting of lead ores, which comprises passing combustion supporting gases through the material therein whereby the mass is maintained at a temperature above the fusion point of the lead, breaking up the surface of said material, and reforming said surface with a comparatively steep slope and mechanically imparting a momentum to the particles whereby the larger particles are automatically separated from the finer particles and caused to segregate toward the lower side.

3. The method of operating a hearth in the smelting of lead ores, which comprises maintaining a sufficiently high temperature in said hearth to smelt the lead and cause the charge to partially fuse on the surface thereof, breaking up said charge and reforming the surface thereof with a slope above the angle at which the large particles will be brought to rest whereby said particles may be automatically separated from the finer particles and caused to segregate toward the lower side in response to an initial momentum.

4. The method of operating a hearth in the smelting of lead ores, which comprises feeding a suitable mixture of ore and fuel thereto, maintaining the mixture above the fusion point of the lead but below the volatilization point thereof, whereby the molten lead is separated from the ore and sinks to the bottom of the hearth and the material partially fuses on the surface thereof, forming the surface at a steep slope from the back to the front of the hearth and mechanically causing an initial movement of the larger particles whereby said particles may be automatically separated and caused to roll toward the front portion thereof.

5. The method of operating a hearth in the smelting of lead ores, which comprises maintaining the material in said hearth at a temperature above the fusion point of lead but below the volatilization point thereof, whereby the solid material is partially fused on the surface of the molten lead, breaking up said charge into particles of varying size, reforming the surface at a comparatively steep slope from the back to the front of the hearth and throwing the ore particles from the surface into the air and allowing them to fall back upon the hearth whereby the larger particles may be automatically separated and caused to roll toward the front portion.

6. The process of operating a hearth for the smelting of lead ores which comprises forming the ore and fuel with a surface having a sufficiently steep slope so that the slag and large particles may be automatically separated and caused to roll toward the lower side by gravity.

7. The process of operating a hearth in the smelting of lead ores, which comprises forming the material in said hearth relatively deep at the back portions and with a surface sloping toward the front at a sufficient angle so that the coarse particles may be separated from the fine particles by gravity and caused to roll toward the lower portion in response to an initial impetus.

8. The process of operating a hearth in the smelting of lead, which comprises breaking up the surface crust, reforming the particles of ore, fuel and slag with a sloping surface and throwing the particles against the back of the hearth, whereby the slag may be automatically separated toward the lower side and caused to roll down said surface.

9. The process of operating a hearth in the smelting of lead ores, which comprises breaking up the partially fused material on the surface and reforming the material in said hearth with a relatively high back and with a slope toward the front thereof sufficiently steep so that the larger particles are automatically separated toward the lower portion in response to an initial impetus and caused to roll down said slope.

10. The process of operating a hearth in the smelting of lead, which comprises forming the ore and fuel with a surface sloping at an angle greater than the angle of repose of the larger particles whereby they may be automatically separated and caused to roll toward the lower side.

11. The process of operating a hearth in the smelting of lead ores, which comprises forming the material in said hearth with a relatively high back and with a slope toward the front thereof above the angle at which the coarse particles will come to rest whereby they may be automatically separated and caused to roll toward the lower portion.

12. The method of operating a hearth comprising a smelting basin, a comparatively high back through which combustion supporting gases are admitted and an apron at the front thereof, which consists in piling the charge against the back portion of the hearth with a steep sloping surface toward the apron, breaking up the surface whereby a portion thereof may fall upon said apron, re-forming said surface at an angle greater than the angle at which the coarse particles will come to rest, giving an impetus to said particles whereby they may separate from the fine particles and segregate upon said apron, and permitting the fine particles to remain at the rear of said hearth whereby an even combustion is maintained throughout the entire hearth.

13. The method of operating a hearth comprising a smelting basin, a comparatively high back through which combustion supporting gases are admitted and an apron at the front thereof, which consists in piling the charge against the back portion of the hearth with a steep surface sloping toward the apron, passing combustion supporting gases through the charge until the surface becomes partially fused breaking up the surface, and re-forming the same by throwing the particles against the back portion with sufficient velocity whereby the larger particles may separate and roll toward the lower side of the charge.

14. The method of operating a hearth comprising a smelting basin and a comparatively high back through which combustion supporting gases are admitted, which consists in piling the charge against the back portion of the hearth with a surface sloping toward the front, passing combustion supporting gases therethrough, breaking up the surface, and re-forming said surface by throwing the particles toward the back with sufficient velocity whereby the coarse particles separate due to their inertia and roll toward the lower side.

15. The method of operating a hearth which comprises selectively segregating the material therein contained into particles of progressively increasing size from the rear to the front portion thereof, whereby the combustion supporting gases which are applied at the rear portion tend to permeate the entire mass substantially uniformly.

16. The method of operating a hearth which comprises piling the material therein with a surface sloping toward the front at a sufficiently steep angle to cause the larger particles to automatically separate and roll to the front portion thereof.

In testimony whereof I have hereunto set my hand.

HUGH R. MacMICHAEL.